Dec. 4, 1923.

C. F. COWDREY 1,476,393

AUTOMOBILE ATTACHMENT

Filed March 6, 1923

INVENTOR
Charles F. Cowdrey
BY Rob't O. Hains
ATTORNEY

Patented Dec. 4, 1923.

1,476,393

UNITED STATES PATENT OFFICE.

CHARLES F. COWDREY, OF FITCHBURG, MASSACHUSETTS.

AUTOMOBILE ATTACHMENT.

Application filed March 6, 1923. Serial No. 623,089.

*To all whom it may concern:*

Be it known that I, CHARLES F. COWDREY, a citizen of the United States, residing at Fitchburg, in the county of Worcester and State of Massachusetts, have invented an Improvement in Automobile Attachments, of which the following description, in connection with the accompanying drawings, is a specification, like characters on the drawings representing like parts.

This invention relates to means for holding the foot-brake treadle of an automobile in the brake applying position, so that the action of the applied foot-brake upon each rear wheel may be tested.

It is important that brakes of an automobile or other vehicle be so adjusted that they will act with equal or substantially equal force upon the rear wheels of the same, and while this is true of both the foot-brake and the emergency brake, the condition of the foot-brake is in most cases the more important.

In operating an automobile, the foot-brake or running brake is the one that is commonly used to check the speed of the automobile, and if the foot-brake does not act with substantially equal force on the rear wheels of the automobile, one wheel will exert a greater retarding force upon the automobile than the other, and this is likely to cause the automobile to skid sidewise with dangerous results.

The importance of maintaining the brakes of an automobile adjusted so that they will act with equal force on the opposite wheels is recognized in the automobile industry, and proper adjustment of the brake upon the opposite wheels is sought by turning the wheels by hand under brake resistance, but such hand adjustment without means for comparing the action of the brakes, is guesswork and unreliable. The need of means for accurately determining the action of a brake upon the opposite rear wheels of an automobile is therefore apparent, and in the United States Patents Nos. 1,440,970, 1,440,971, and 1,440,972 granted to me, are shown, described and claimed, different devices for testing automobile brakes.

In accordance with the disclosure of these patents the brake action upon the opposite wheels is tested by applying the brake to be tested, and then exerting a force upon one wheel to be tested to determine the force required to turn the wheel under that particular application of the brake. The opposite wheel is then tested while the application of the brake remains the same to determine whether or not the action of the brake is the same on both wheels. When the braking action of the emergency brake is to be tested the brake may be set as usual, but when the action of the foot-brake is to be tested, difficulty is experienced in maintaining the foot-brake applied with the same force throughout the testing of the brake action on each wheel.

The primary feature of the present invention, therefore, resides in simple means for holding the foot-brake of an automobile applied with the same force throughout the operation of testing the action of the foot-brake on each wheel.

More specifically the primary feature of the present invention resides in a simple attachment that may be readily positioned to hold the foot-brake treadle depressed a desired amount throughout the brake testing operation.

One simple and satisfactory embodiment of the invention is shown in the accompanying drawings, wherein.

Figure 1:
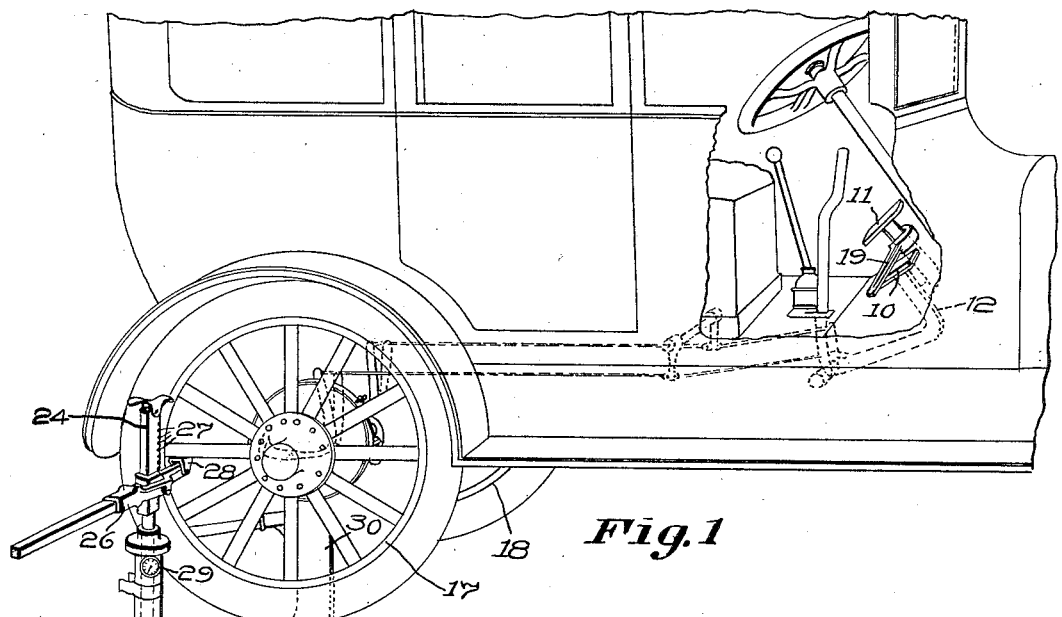
Fig. 1 is a perspective view of a portion of an automobile showing the foot-brake treadle held depressed by the attachment of the present invention.

The automobile shown has the usual foot-brake treadle 10 and foot-clutch treadle 11 each of which is normally held yieldingly in the raised position and is depressed by pressure of the operator's foot upon the same. The treadles 10 and 11 are secured to the downwardly extending stems or posts 12 and 13 respectively which extend through openings 14 and 15 in the floor board 16 of the automobile. The brake treadle 10, upon being depressed applies a braking force to the rear wheels 17 and 18.

As stated the present invention relates to simple means for maintaining the brake treadle 10 depressed during the operation of testing the action of the foot-brake upon each rear wheel of the automobile, and a simple efficient attachment for this purpose will now be described.

Figure 3:
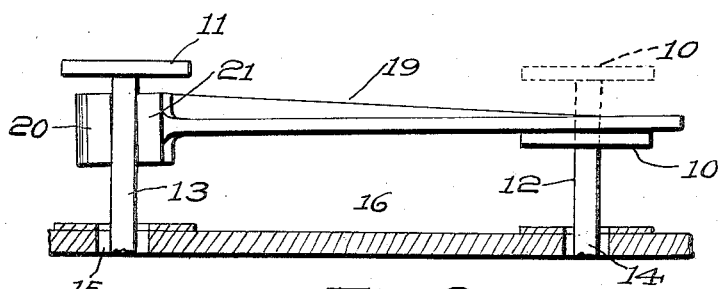
Fig. 3 is a sectional view through parts shown in Fig. 2.

Most automobiles now in use are provided with springs or other means for normally holding the treadles 10 and 11 elevated, as shown in full lines to the left in Fig. 3, and in dotted lines to the right in this figure, and stops, not shown, serve to limit the upward movement of these treadles, so that neither may be forced upwardly beyond its normal raised position. The present invention contemplates an attachment 19 which may be readily secured to the stem or post 13 of the clutch treadle to extend laterally therefrom over the brake treadle 10 and into position to hold the latter depressed.

The attachment 19 shown, consists of a relatively long straight bar having a head at one end thereof provided with spaced jaws 20 and 21 adapted to receive the stem 13 therebetween. The construction is such that the jaws 20 and 21 may be readily engaged with the opposite sides of the stem 13 so that the attachment 19 will extend laterally therefrom as shown, with the outer end of the attachment extending over the brake treadle 10 to hold the latter depressed. The upward pressure which the treadle 10 exerts upon the outer end of the bar 19 serves to cant the same slightly as shown so that the jaws 20 and 21 will grip the opposite sides of the stem 13 with sufficient friction to prevent the head from being slid along the stem by the upward pressure of the foot treadle, and the stop above mentioned that limits the upward movement of the clutch treadle prevents this treadle from being forced upwardly beyond its normal raised position by the upward pressure of the brake treadle.

As a result of this construction the jaws 20 and 21 may be spaced apart sufficiently to freely receive the stem 13 therebetween, and the attachment 19 may be adjusted by hand lengthwise of the stem 13 to hold the brake treadle 10 depressed to any desired position, and the upward pressure of the brake treadle upon the outer end of the attachment or bar 19 serves to hold the latter firmly in the desired position of adjustment.

The attachment or bar 19 is shown and described as being secured to the stem 13 to hold the break treadle depressed, but it is apparent that this attachment may be similarly engaged with any other post or upstanding portion adjacent the foot-brake treadle to hold the latter depressed, and the distance between the jaws 20 and 21 may be varied in accordance with the size of the object to be received therebetween.

Figure 2:
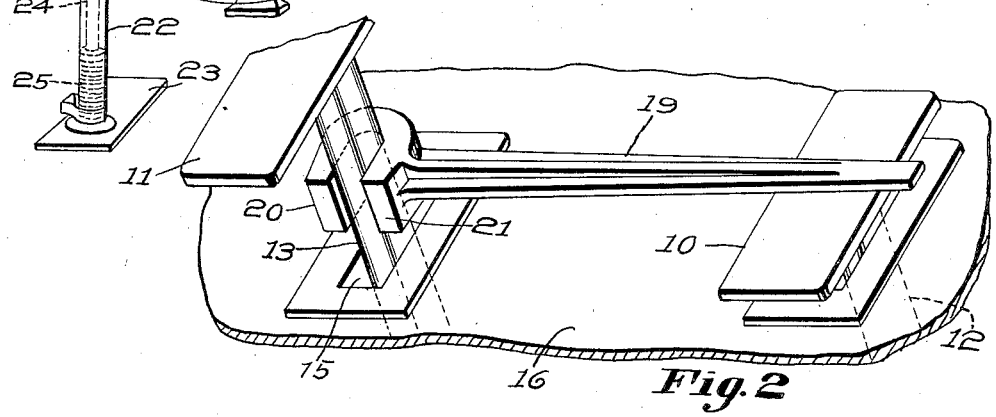
Fig. 2 is an enlarged perspective view of a portion of Fig. 1 showing the foot-clutch treadle in its normal position and the foot-brake treadle held depressed.

When the operation of testing the action of the foot-brake upon the rear wheels is completed, the attachment 19 may be easily removed from the holding position shown in Figs. 1, 2 and 3, whereupon the brake treadle will return to its normal position indicated in dotted lines in Fig. 3.

The brake testing device may be variously constructed, and three different constructions are shown in my patents above cited. A construction differing somewhat from the disclosure of these patents is shown in the accompanying drawings and may be briefly described as follows: A hollow support 22 is provided with a base plate 23 and a post 24 is yieldingly supported within the support 22 by a spring 25 so that the post may yield downwardly as the pressure upon the same is increased. A rocking lever 26 is pivotally supported by the post 24 and may be adjusted lengthwise thereof, the notches 27 serve to support the lever in different positions of adjustment lengthwise of the post. The lever 26 has a saddle 28 pivotally secured to one end thereof to engage a spoke of a wheel and this saddle is raised by rocking the opposite end of the lever downwardly. A gage 29 serves to indicate the pressure it is necessary to exert upon an automobile wheel to rotate it under the brake resistance, and this gage is actuated by the downward movement of the post 24.

The rear wheels 17 and 18 of the automobile preferably are relieved from the weight of the automobile during the testing operation by one or more suitable jacks 30. The construction shown is adapted to test the brakes under any desired adjustment of the brakes, but the test preferably is made when the brake is applied with substantial force to determine whether or not the brake acts with equal force upon the wheels under this condition.

What is claimed is:

1. An attachment for holding the foot brake treadle of an automobile in brake applying position, comprising a bar having jaws adapted to engage the opposite sides of the stem of the foot clutch treadle to secure the bar thereto in a laterally extending direction and in position to hold the foot brake treadle depressed.

2. An attachment for holding the foot brake treadle of an automobile in brake applying position, comprising a bar having jaws adapted to engage the opposite sides of the stem of the foot clutch treadle and to grip the same upon canting the bar, thereby to secure the bar to the stem in a laterally extending direction and in position to hold the foot brake treadle depressed.

3. An attachment for holding the foot brake treadle of an automobile in brake applying position, comprising a bar having spaced rigid jaws adapted to engage the stem of the foot clutch treadle at different points along the same to secure the bar to the stem so that it extends in a lateral direction from the stem and in position to extend across the face of the foot brake treadle to hold the latter depressed to different degrees.

4. An attachment for holding the foot brake treadle of an automobile in brake applying position, comprising a bar having spaced fixed jaws adapted to engage a post adjacent the foot treadle to secure the bar to said post to extend laterally therefrom and into position to hold the foot brake treadle depressed.

5. An attachment for holding the foot brake treadle of an automobile in brake applying position, comprising a bar having spaced jaws adapted to engage a post adjacent the foot brake treadle to grip the post upon canting the bar, thereby to secure the bar to the post in a laterally extending direction and in position to hold the foot brake treadle depressed.

In testimony whereof, I have signed my name to this specification.

CHARLES F. COWDREY.